United States Patent [19]
Aksoy et al.

[11] Patent Number: 5,298,347
[45] Date of Patent: * Mar. 29, 1994

[54] BATTERY PACK

[75] Inventors: Adnan Aksoy, Boca Raton; Mark S. Bresin, Coral Springs, both of Fla.

[73] Assignee: Motorola, Inc., Schaumburg, Ill.

[*] Notice: The portion of the term of this patent subsequent to Jan. 19, 2010 has been disclaimed.

[21] Appl. No.: 944,610

[22] Filed: Sep. 14, 1992

[51] Int. Cl.$^5$ .............................................. H01M 2/10
[52] U.S. Cl. .................... 429/98; 429/121; 429/159; 429/163
[58] Field of Search ............... 429/99, 100, 98, 121, 429/159, 1, 9, 121–123, 163; 307/150; 206/333

[56] References Cited

U.S. PATENT DOCUMENTS

| | | | |
|---|---|---|---|
| 5,015,546 | 5/1991 | Dulaney et al. | 429/99 |
| 5,096,788 | 3/1992 | Bresin et al. | 429/99 |
| 5,104,754 | 4/1992 | Dorinski et al. | 429/99 |
| 5,122,927 | 6/1992 | Satou | 429/98 X |
| 5,149,603 | 9/1992 | Fleming et al. | 429/98 |

*Primary Examiner*—Anthony Skapars
*Attorney, Agent, or Firm*—Pablo Meles; Leslie A. Rhyne

[57] ABSTRACT

A battery pack comprises a first housing member (104) having an integrated latch feature (103), a header frame (111) detachably mounted to the first housing member, a plurality of cells (112) for insertion into the header frame and first housing member, circuitry on the header for coupling the plurality of cells and providing charger and power contacts, and a second housing member (102) being substantially laminar and being adhesively attached to said first housing member.

19 Claims, 3 Drawing Sheets

BATTERY PACK

TECHNICAL FIELD

This invention relates generally to battery cell packs, and more specifically to battery pack construction.

BACKGROUND

Battery packs for portable devices such as two-way radios typically comprise a number of cells having contacts welded together all within a housing. The individual cells are interconnected using sheet metal tabs which are spot welded to the cell terminals. Usually, the interconnected cells are then spot welded to a flex circuit and subsequently inserted into a battery housing. This method of manufacture is wrought with inefficient assembly procedures and unnecessary parts and labor resulting in excessive manufacturing expense and compromised reliability.

Consumer loaded batteries for consumer electronics such as cameras, radios, CD players, etc., typically have spring loaded contacts on one end and metal contacts coupled to the opposite end of the primary cells. Consumer loaded battery packs do not require the extra circuitry typically found in battery packs. Battery packs for portable radios will usually include resistors, thermistors, diodes and other components that enable the battery packs to be rechargeable and/or intrinsically safe. Thus, consumer loaded battery compartments may only have stamped metal on the housing and electrical loss between battery cells and circuitry is of little concern in these applications.

Other battery packs, which are either consumer loaded or loaded and sealed by the manufacturer typically comprise a number of cells that are shrink wrapped together or packaged in a plastic housing. Again, many of these cells are typically coupled together electronically by welding steel tabs to unlike terminals (positive and negative) on separate cells. Subsequently, the welded cells are shrink wrapped together and inserted into a housing. Again, this assembly procedure is inefficient, resulting in excessive labor and manufacturing costs.

The drive to reduce weight in electronic consumer products is now impacting battery pack assembly as much as the drive to increase the ease of assembly or manufacturability of battery packs. Therefore, the ability to integrate features in less components and parts is critical in reducing the number of assembling steps. Therefore, a need exists for a battery pack that provides the convenience of consumer loaded battery packs, provides for a reduction in weight, and allows for greater efficiency and reduced cost in assembly and manufacture.

SUMMARY OF THE INVENTION

A battery pack comprises a first housing member having an integrated latch feature, a header frame detachably mounted to the first housing member, a plurality of cells for insertion into the header frame and first housing member, circuitry on the header for coupling the plurality of cells and providing charger and power contacts, and a second housing member being substantially laminar and being adhesively attached to said first housing member.

DETAILED DESCRIPTION OF THE PREFERRED EMBODIMENT

Figure 1:
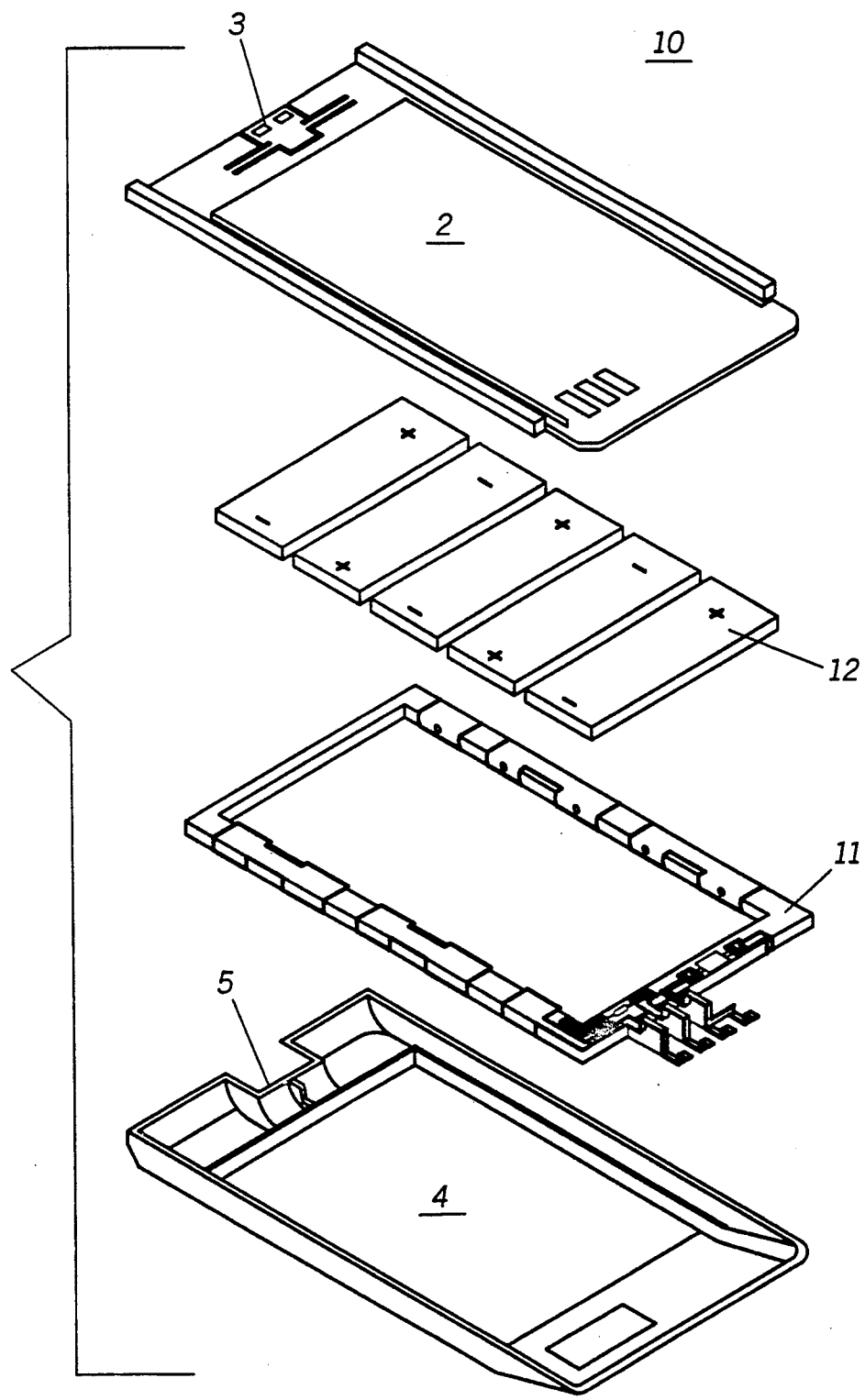
FIG. 1 is a perspective view of a battery pack.

Referring to FIG. 1, there is shown a perspective view of a battery pack 10 discussed in patent application Ser. No. 07/848465, now U.S. Pat. No. 5,180,644 assigned to the present assignee, Motorola, Inc. and hereby incorporated by reference. The battery pack 10 comprises a housing having a top portion 2 and a bottom portion 4. The housing portions are preferably constructed to snap together. Alternatively, the housing portions could be ultrasonically welded together. The top housing member 2 also includes a latch feature 3 that mates with a recessed area 5 in the bottom portion 4 to allow the detachable coupling of the battery pack 10 to a radio (not shown). Within the housing portions 2 and 4, lies a header frame 11 (for holding cells 12) being detachably mounted into at least one of the housing portions.

Figure 2:
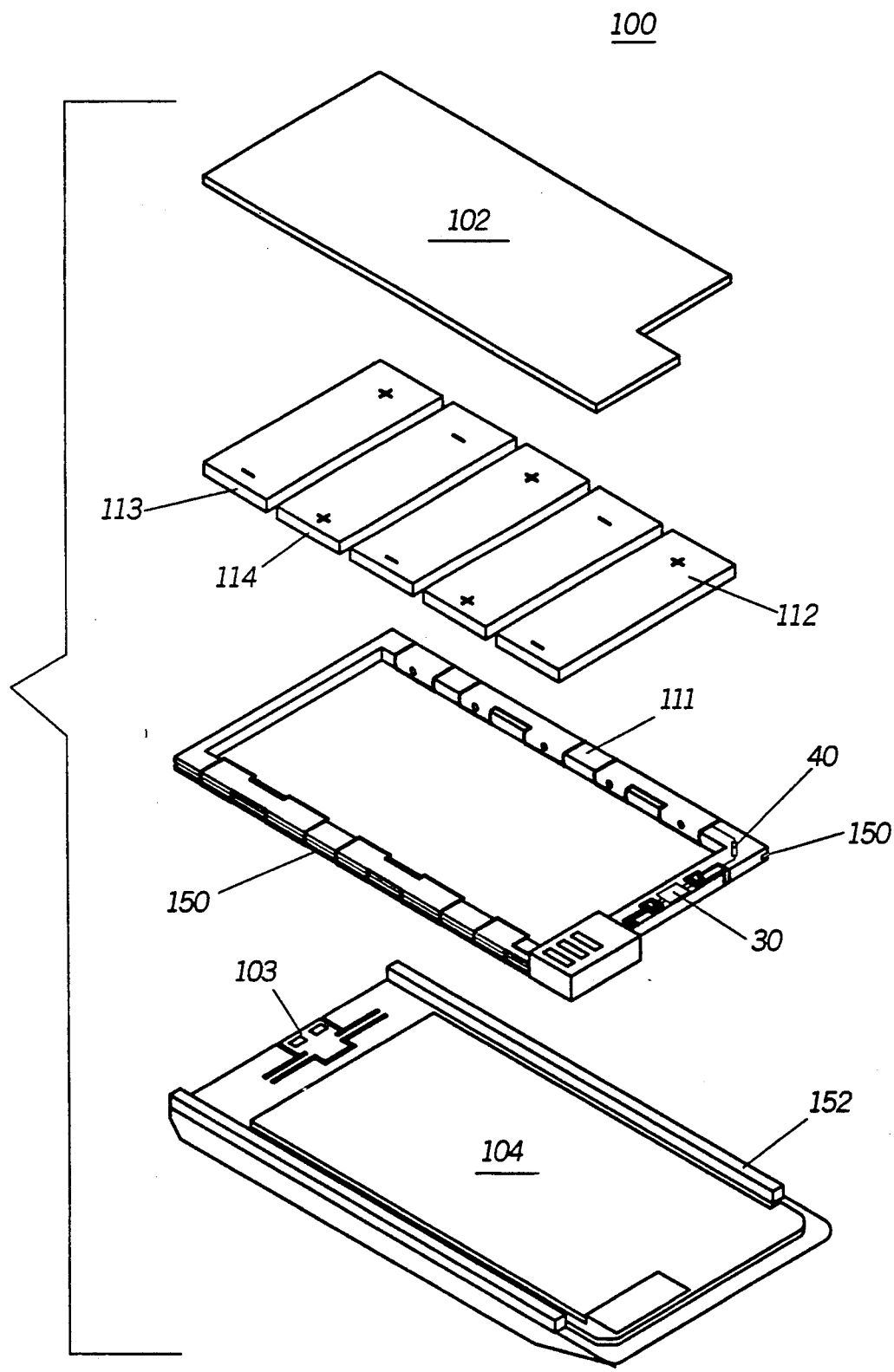
FIG. 2 is a perspective view of a battery pack in accordance with the present invention.

Referring to FIG. 2, there is shown a perspective view of a battery pack 100 in accordance with the present invention. The battery pack 100 preferably comprises a first housing member 104 having a latch feature 103 incorporated or integrated into the first housing member 104. Next, a header frame 111 is mounted into the first housing member 104. The header frame is preferably snapped into the first housing member via the groove 150 in the header and the mating railing 152 within the housing member 104. Alternatively, the header frame 111 could be integrated as part of the first housing member 104 as well. Another option is to ultrasonically weld the header frame 111 to the first housing member 104. Battery cells 112 having positive and negative terminals 114 and 113 respectively are then oriented and inserted into the header frame 111. Circuitry means preferably including resistors (not shown), polyswitches (30), and thermistors (40) are mounted on the header frame 111 to provide charging and power contacts and the appropriate circuitry for safely charging rechargeable battery packs as is known in the art. Alternatively, the circuitry means could comprise a flex circuit having some of the components such as the resistors, polyswitches and thermistors, which further interconnects the cells. Finally, a second housing member 102 is preferably adhesively attached to the first housing member. In order to maximize the reduction in weight, the second housing member 102 is preferably a laminar piece of plastic such as polycarbonate having adhesive on its interior surface for adhering to the first housing member 104. Alternatively, the second housing member 102 could be ultrasonically welded to the first housing member 104. Additionally, the second housing member 102 could serve as a label for the battery 100.

Figure 3:
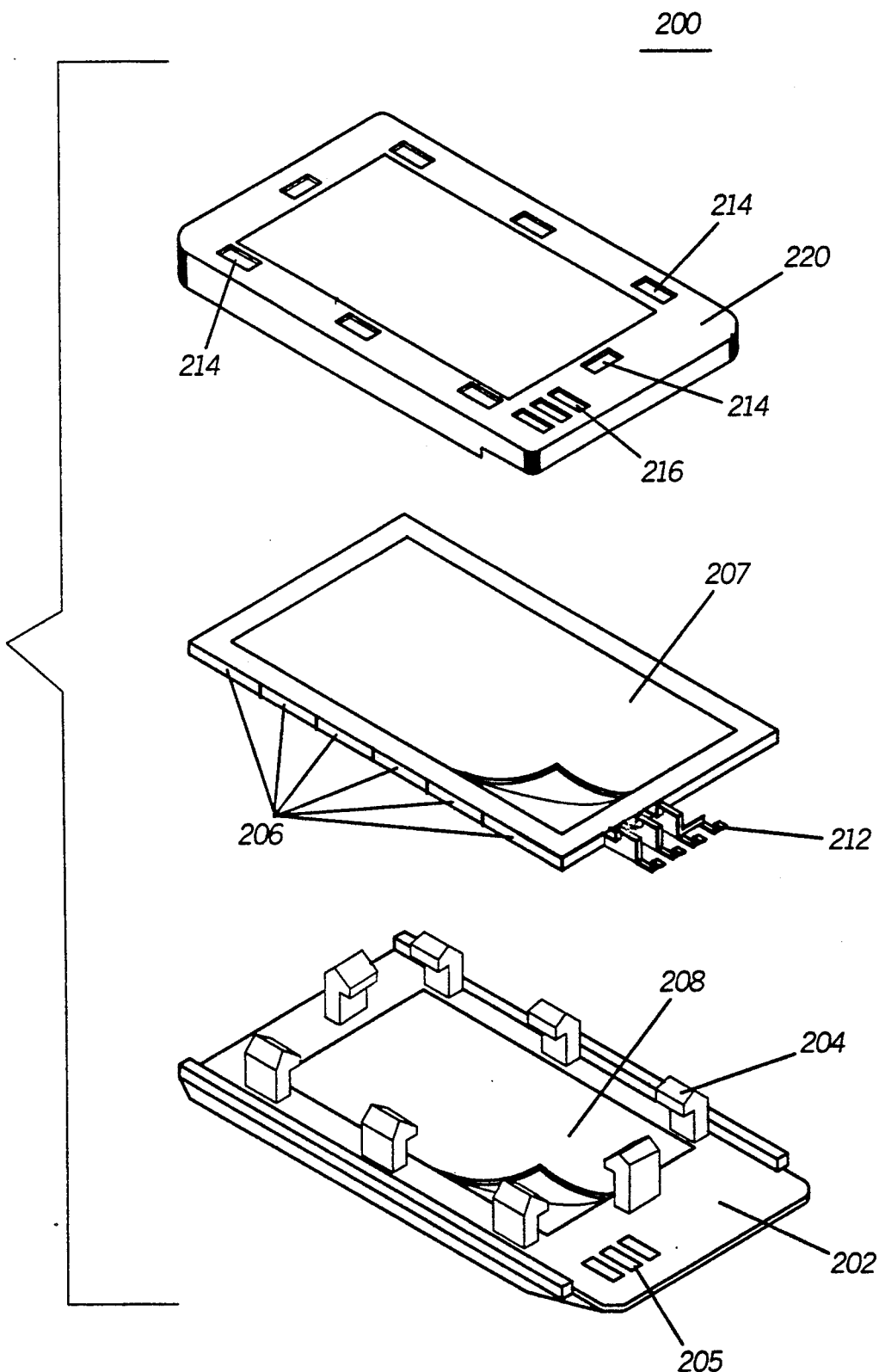
FIG. 3 is a perspective view of a another battery pack in accordance with the present invention.

Referring to FIG. 3, there is shown an alternative battery pack 200 in accordance with the present invention. The pack 200 comprises a first housing 202 preferably having snap features 204 integrally formed in the first housing. A plurality of cells 206, preferably prepackaged into a cell pack is placed and retained within the snap features 204. The cell pack also preferably includes a flex circuit 212 providing further interconnection between cells, contacts and other required components such as resistors and thermistors (not shown). Finally a second housing member 220 is placed on top of the cell pack 206 and snaps to the first housing member 202. The Second housing member preferably has openings 214 for retention by the snap features 204. Additionally, openings 216 are formed in the second housing member allowing for contact points when contacts shown on the flex 212 are inserted within the openings 216. Likewise, the first housing member 202 has openings 205 allowing for the insertion of contact points shown on the flex 212. Optionally, further integrity can be provided to the battery pack 200 by using double sided adhesive (208) (such as tape) between the inner potion of the first housing and the bottom of the cell package 206 and using double sided adhesive (207) between the inner portion of the second housing 220 and the top of the cell package 210.

What is claimed is:

1. A battery pack, comprising:
   a first housing member having an integrated latch feature;
   a header frame, detachably mounted to the first housing member;
   a plurality of cells for insertion into the header frame and first housing member;
   circuitry means on the header for coupling the plurality of cells and providing charger and power contacts; and
   a second housing member being substantially laminar and being attached to said first housing member.

2. The battery pack of claim 1, wherein the second housing member also serves as a label for the battery pack.

3. The battery pack of claim 1, wherein circuitry means comprises molded in circuitry on the header frame and on spring fingers on the header frame, said spring fingers being biased toward the positive and negative terminals of the cells and providing the interconnection for said plurality of cells.

4. The battery pack of claim 1, wherein the circuitry means further comprises charger contacts for recharging said plurality of cells.

5. The battery pack of claim 1, wherein the circuitry means further comprises battery contacts for providing power to a portable electronic device.

6. The battery pack of claim 1, wherein the circuitry means further comprises battery contacts for providing power to a portable electronic device and charger contacts for recharging said plurality of cells.

7. The battery pack of claim 1, wherein said plurality of cells are prismatic cells.

8. The battery pack of claim 1, wherein the second housing member is mounted to the first housing member using adhesive.

9. The battery pack of claim 1, wherein the header frame is made of a thermoplastic selected from a group consisting of polyetherimide, polysulfone, polyethersulfone, polyetheretherketone, polycarbonate, polyimide, and blends of these materials.

10. The battery pack of claim 1, wherein the circuitry means comprises a flex circuit.

11. The battery pack of claim 1, wherein the circuitry means further comprises a polyswitch.

12. The battery pack of claim 1, wherein the circuitry means further comprises a thermistor.

13. A battery pack, comprising:
    a first housing member having an integrated latch feature;
    a header frame, integrally formed in the first housing member;
    a plurality of cells for insertion into the header frame and first housing member;
    circuitry means on the header for coupling the plurality of cells and providing charger and power contacts; and
    a second housing member being substantially laminar and being attached to said first housing member.

14. The battery pack of claim 13, wherein the circuit disposed on the header frame further comprises battery contacts for providing power to a detachable electronic device.

15. The battery pack of claim 13, wherein the circuit disposed on the header frame further comprises charger contacts for recharging the plurality of cells.

16. The battery pack of claim 13, wherein the second housing member serves as a label and cover.

17. A battery pack, comprising:
    a first housing member having integral snap features;
    a plurality of cells retained by the integral snap features;
    a second housing member having openings wherein the integral snap features of the first housing members mate with the openings of the second housing for retaining the plurality of cells.

18. The battery pack of claim 17, wherein cells are prepackaged into a cell package with a flex circuit and inserted into the snaps.

19. The battery pack of claim 18, wherein double sided adhesive is further used to retain the inner portion of the first housing to the bottom of the cell package and double sided adhesive is used to retain the inner portion of the second housing to the top of the cell package.

* * * * *